United States Patent
Welton et al.

(10) Patent No.: US 9,890,316 B2
(45) Date of Patent: Feb. 13, 2018

(54) FLUID MOBILITY MODIFIERS FOR INCREASED PRODUCTION IN SUBTERRANEAN FORMATIONS

(71) Applicant: Halliburton Energy Services, Inc., Houston, TX (US)

(72) Inventors: Thomas Donovan Welton, Conroe, TX (US); Glenn S. Penny, Duncan, OK (US); Jeremy Holtsclaw, Kingwood, TX (US); Dipti Singh, Kingwood, TX (US); Melissa C. Weston, Duncan, OK (US); Nathan Schultheiss, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 14/331,601

(22) Filed: Jul. 15, 2014

(65) Prior Publication Data
US 2015/0068744 A1 Mar. 12, 2015

Related U.S. Application Data

(60) Provisional application No. 61/877,019, filed on Sep. 12, 2013.

(51) Int. Cl.
*C09K 8/528* (2006.01)
*C09K 8/08* (2006.01)
(Continued)

(52) U.S. Cl.
CPC ............. *C09K 8/08* (2013.01); *C09K 8/514* (2013.01); *C09K 8/528* (2013.01); *C09K 8/602* (2013.01);
(Continued)

(58) Field of Classification Search
CPC ..................................... C09K 8/584
See application file for complete search history.

(56) References Cited

U.S. PATENT DOCUMENTS

| 5,310,002 A * | 5/1994 | Blauch ............... C09K 8/58 166/305.1 |
| 6,593,279 B2 | 7/2003 | Von Krosigk et al. |

(Continued)

FOREIGN PATENT DOCUMENTS

WO 2016010518 A1 1/2016

OTHER PUBLICATIONS

Silver Fern Chemical. Surfactant List.*
(Continued)

*Primary Examiner* — William D Hutton, Jr.
*Assistant Examiner* — Avi T Skaist
(74) *Attorney, Agent, or Firm* — McDermott Will & Emery LLP

(57) ABSTRACT

Embodiments including methods comprising providing a treatment fluid comprising a first aqueous base fluid and a polymeric gelling agent, wherein the treatment fluid comprises a first surface tension; introducing a fluid mobility modifier into the treatment fluid, wherein the fluid mobility modifier comprises: a first surfactant selected from the group consisting of a non-ionic surfactant; a cationic surfactant; and any combination thereof, and a solvent-surfactant blend comprising a second aqueous base fluid, a second surfactant, a solvent, and a co-solvent, wherein the ratio of the first surfactant to the solvent-surfactant blend is in the range of between about 1:5 to about 5:1, wherein the fluid mobility modifier causes the treatment fluid to adopt a second surface tension that is less than the first surface tension; and introducing the treatment fluid into a subterranean formation.

15 Claims, 1 Drawing Sheet

(51) Int. Cl.
  *C09K 8/514* (2006.01)
  *C09K 8/60* (2006.01)
  *C09K 8/68* (2006.01)
  *C09K 8/72* (2006.01)
  *C09K 8/90* (2006.01)

(52) U.S. Cl.
  CPC ............... *C09K 8/605* (2013.01); *C09K 8/68* (2013.01); *C09K 8/725* (2013.01); *C09K 8/90* (2013.01); *C09K 2208/12* (2013.01); *C09K 2208/28* (2013.01); *C09K 2208/32* (2013.01)

(56) References Cited

U.S. PATENT DOCUMENTS

| | | | |
|---|---|---|---|
| 7,073,588 B2* | 7/2006 | Cassidy | C09K 8/524 166/307 |
| 2002/0091164 A1 | 7/2002 | Parmar et al. | |
| 2007/0265171 A1* | 11/2007 | Javora | C09K 8/52 507/90 |
| 2008/0066918 A1 | 3/2008 | Smith | |
| 2008/0194427 A1 | 8/2008 | Welton et al. | |
| 2008/0287324 A1* | 11/2008 | Pursley | C09K 8/52 507/218 |
| 2009/0120642 A1 | 5/2009 | Eoff et al. | |
| 2009/0200027 A1* | 8/2009 | Kakadjian | B01F 17/0085 166/270.1 |
| 2009/0281004 A1* | 11/2009 | Ali | C09K 8/602 507/219 |
| 2011/0048718 A1* | 3/2011 | Van Zanten | C09K 8/12 166/305.1 |
| 2013/0048281 A1 | 2/2013 | Van Zanten et al. | |
| 2014/0096969 A1 | 4/2014 | Ali et al. | |

OTHER PUBLICATIONS

Edwards et al., Chloride Concentration Gradients in Tank-Stored Hydraulic Fracturing Fluids Following Flowback, U.S. Dept. of Agriculture, Research Paper-NRS-14, 2011.
Anadarko Petroleum Corporation, Echo Springs Federal 34-12D, Hydraulic Fracturing Fluid Product Component Information Disclosure, Nov. 30, 2011.
International Search Report and Written Opinion for PCT/US2014/046649 dated Mar. 24, 2015.

* cited by examiner

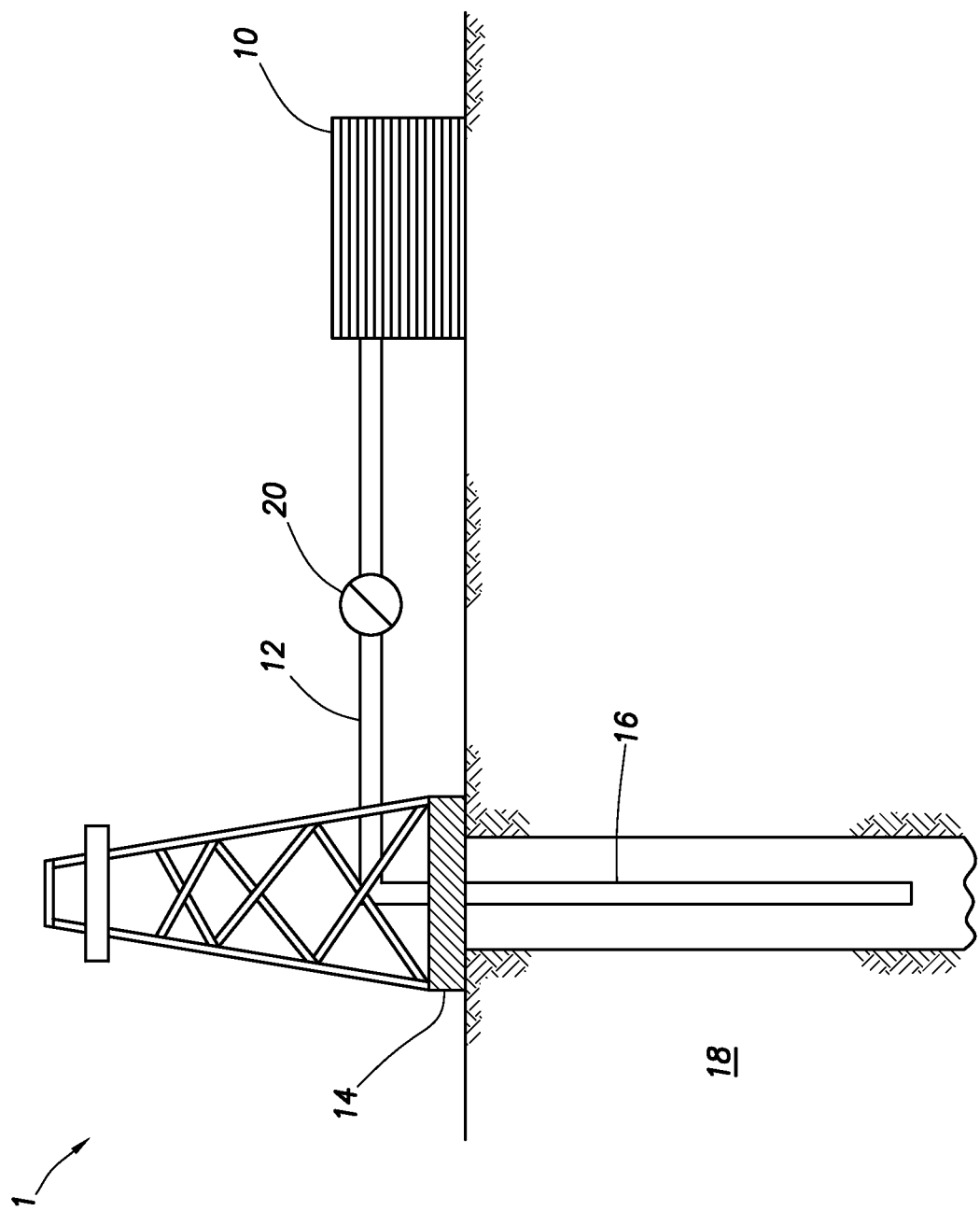

US 9,890,316 B2

FLUID MOBILITY MODIFIERS FOR INCREASED PRODUCTION IN SUBTERRANEAN FORMATIONS

BACKGROUND

The embodiments herein relate to fluid mobility modifiers for increased production in subterranean formation operations.

Subterranean wells (such as hydrocarbon or natural gas producing wells) may be porous and permeable, affecting their ability to store hydrocarbons (e.g., oil or natural gas) and the facility with which they can be extracted from the formation. To improve recovery of hydrocarbons, such subterranean wells are often stimulated by hydraulic fracturing treatments. In hydraulic fracturing treatments, a viscous fracturing fluid, which may also function as a carrier fluid, is pumped into a portion of a subterranean formation at a rate and pressure such that the subterranean formation breaks down and one or more fractures are formed. Typically, particulates, such as graded sand, are suspended in a portion of the fracturing fluid or another fluid and then deposited into the fractures. These particulates, referred to herein as "proppant particulates" or simply "proppant," serve to prevent the fractures from fully closing once the hydraulic pressure is removed. By keeping the fracture from fully closing, the proppant aids in forming conductive paths through which fluids may flow. As used herein, the term "fluid" refers to a substance that is capable of flowing, including particulate solids, liquids, and gases.

Fracturing fluids are often viscosified using chemicals, such as gelling agents (e.g., polymers) or gelling agents in combination with crosslinking agents. Additional chemicals may also be included in the fracturing fluids so as to accommodate the specific properties of a particular subterranean formation, operation, and the like. In some instances, these chemicals may damage the subterranean formation by entering into the reservoir rock and blocking pore throats. Fracturing fluids or the chemicals included therein may also become trapped in the formation due to capillary end effects in and around the vicinity of fractures formed therein. Such fluid invasion, or phase trapping, may lead to blocking of hydrocarbon production within a formation.

Fracturing fluids may form emulsions in the subterranean formation during a treatment operation. Such emulsion tendencies may be due to immiscibility between two fluids within the fracturing fluid, including between base fluids and chemicals added into the fracturing fluid (e.g., gelling agents). Such emulsions may associate strongly with the subterranean formation and result in phase trapping, thus impeding flow and impairing production of the formation. The emulsion tendency of fracturing fluids may be treated with non-emulsifiers. However, only certain fracturing fluid formulations may be responsive to such non-emulsifiers. As such, non-emulsifiers are often not capable of universal use for preventing or reducing the emulsion tendency of a particular fracturing fluid.

BRIEF DESCRIPTION OF THE DRAWINGS

The following FIGURE are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to fluid mobility modifiers for increased production in subterranean formation operations. Specifically, the fluid mobility modifiers described herein are capable of reducing the emulsion tendency of certain treatment fluids (e.g., fracturing fluids, completion fluids, and the like). As used herein, the term "emulsion tendency" refers to the surface tensions at fluid interfaces within a treatment fluid. That is, the emulsion tendency of a treatment fluid may be evaluated by determining the surface tension at the fluid interfaces of the treatment fluid. By using the fluid mobility modifiers disclosed in the embodiments herein, the emulsion tendency of the treatment fluids described herein may be reduced, thus improving the productivity of the particular subterranean formation being treated.

Although some embodiments described herein are illustrated by reference to hydraulic fracturing operations in subterranean formations, the fluid mobility modifiers may be used in any subterranean operation that may benefit from reducing the emulsion tendency of a treatment fluid. Such treatment operations may include, but are not limited to, a drilling operation; a lost circulation operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof. Moreover, the fluid mobility modifiers described herein may be used in any non-subterranean operation that may benefit from reducing the emulsion tendency of a fluid. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be mixture and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present invention provides a method comprising providing a treatment fluid comprising a first aqueous base fluid and a polymeric gelling agent. The treatment fluid comprises a first surface tension (i.e., emulsion tendency). A fluid mobility modifier is added into the treatment fluid so as to cause the treatment fluid to adopt a second surface tension that is less than the first surface tension. The fluid mobility modifier comprises a first surfactant selected from the group consisting of a non-ionic surfactant; a cationic surfactant; and any combination thereof (which also may be referred to as "non-ionic surfactant and/or cationic surfactant" herein) and a solvent-surfactant blend comprising a second aqueous base fluid, a second surfactant, a solvent, and a co-solvent. The treatment fluid comprising the fluid mobility modifier is then introduced into a subterranean formation in order to form a subterranean operation.

The aqueous base fluid that may be used in the treatment fluids or fluid mobility modifiers described herein include, but are not limited to, fresh water; saltwater (water containing one or more salts dissolved therein); brine (e.g., saturated salt water; seawater (e.g., naturally occurring water containing one or more salts dissolved therein); produced water (e.g., water that is recovered along with oil or gas in a subterranean formation); reclaimed water (e.g., treated or untreated wastewater); and any combination thereof. Generally, the water may be from any source, provided that it does not contain components that might adversely affect the stability and/or performance of the treatment fluids and the fluid mobility modifiers described herein.

The polymeric gelling agent may be cationic or anionic. In preferred embodiments, the polymeric gelling agent is anionic. Examples of such suitable polymeric gelling agents may include, but are not limited to, a derivatized guar gum (e.g., carboxymethyl guar, carboxymethylhydroxyethyl guar, and carboxymethylhydroxypropyl guar ("CMHPG")); a cellulose derivative (e.g., hydroxyethyl cellulose, carboxyethylcellulose, carboxymethylcellulose, and carboxymethylhydroxyethylcellulose); xanthan; succinoglycan; alginate; chitosan; any derivative thereof; and any combination thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. Examples of suitable commercially available polymeric gelling agents for use in the methods and compositions of the present invention include, but are not limited to, WG-39™, available from Halliburton Energy Services, Inc. in Houston, Tex.

In some embodiments, the polymeric gelling agent may be present in an amount in the range of from a lower limit of about 1 pounds per thousand gallons ("ppt"), 5 ppt, 10 ppt, 15 ppt, 20 ppt, 25 ppt, 30 ppt, 35 ppt, 40 ppt, 45 ppt, and 50 ppt to an upper limit of about 100 ppt, 95 ppt, 90 ppt, 85 ppt, 80 ppt, 75 ppt, 70 ppt, 65 ppt, 60 ppt, 55 ppt, and 50 ppt of the treatment fluid. The concentration of the polymeric gelling agent may be dependent upon a number of factors such as, for example, the type of polymeric gelling agent used, the type of subterranean formation operation being performed, the conditions of the subterranean formation itself (e.g., pH, temperature, etc.), and the like. One of ordinary skill in the art, with the benefit of this disclosure, will recognize the appropriate concentration of the polymeric gelling agent to achieve a particular result.

The fluid mobility modifiers described herein comprise a nonionic surfactant and/or a cationic surfactant and a solvent-surfactant blend. The non-ionic surfactant and/or cationic surfactant may aid in reducing the emulsion tendency of the treatment fluid in combination with the solvent-surfactant blend. The non-ionic surfactant and/or cationic surfactant and the solvent-surfactant blend operate synergistically with each other to reduce the emulsion tendency of the treatment fluids described herein, such that neither alone is capable of achieving such emulsion tendency reductions. Indeed, in some cases, neither the non-ionic surfactant and/or the cationic surfactant nor the solvent-surfactant blend alone is capable of achieving any emulsion tendency reduction in the treatment fluids.

Suitable non-ionic surfactants may include, but are not limited to, an alkyoxylate (e.g., an alkoxylated nonylphenol condensate, such as poly(oxy-1,2-ethanediyl), alpha-(4-nonylphenyl)-omega-hydroxy-branched); an alkylphenol; an ethoxylated alkyl amine; an ethoxylated oleate; a tall oil; an ethoxylated fatty acid; and combinations thereof. A suitable commercially available non-ionic surfactant may include, but is not limited to, LoSurf-300D™ from Halliburton Energy Services, Inc. in Houston, Tex. Suitable cationic surfactants may include, but are not limited to, a trimethylcocoammonium chloride; a trimethyltallowammonium chloride; a dimethyldicocoammonium chloride; a bis(2-hydroxyethyl)tallow amine; a bis(2-hydroxyethyl)erucylamine; a bis(2-hydroxyethyl)coco-amine; a cetylpyridinium chloride; and combination thereof.

In some embodiments, the non-ionic surfactant and/or cationic surfactant may be suspended in a solvent medium comprising any combination of an aqueous base fluid, a solvent (e.g. heavy aromatic petroleum, naphthalene, and the like), and an alcohol (e.g., ethanol). One of ordinary skill in the art, with the benefit of this disclosure, will recognize when such carrier fluid is needed and what formulation such carrier fluid should possess based on factors, such as the type of non-ionic surfactant and/or cationic surfactant chosen, the composition of the solvent-surfactant blend, the type of polymeric gelling agent selected, and the like.

The solvent-surfactant blends described in some embodiments herein form oil-in-water microemulsions. As used herein, the term "microemulsion" is given its ordinary meaning in the art and refers to dispersions of one immiscible liquid in another, in the form of droplets, with diameters approximately in the range of between a lower limit of about 1 nanometer ("nm"), 10 nm, 20 nm, 30 nm, 40 nm, 50 nm, 60 nm, 70 nm, 80 nm, 90 nm, and 100 nm, to an upper limit of about 200 nm, 190 nm, 180 nm, 170 nm, 160 nm, 150 nm, 140 nm, 130 nm, 120 nm, 110 nm, and 100 nm. Microemulsions are clear or transparent because they contain particles smaller than the wavelength of visible light. In addition, microemulsions are homogeneous, thermodynamically stable single phases that form spontaneously and, thus, differ markedly from thermodynamically unstable emulsions, which generally depend upon intense mixing energy for their formation. Solvent-surfactant blends may comprise vast specific formulations having vast performance characteristics. For that reason, solvent-surfactant blends are not interchangeable and those blends having the formulations described herein are capable of reducing the emulsion tendency of the treatment fluids described herein, where others may not be so capable.

The solvent-surfactant blends described herein may comprise a second aqueous base fluid, a second surfactant, a solvent, and a co-solvent. The aqueous base fluids may be any aqueous base fluid described herein. In preferred embodiments, the aqueous base fluid used in the solvent-surfactant blend is fresh water. The second surfactant may be used to form an interfacial film on the solvent dispersed phase in the microemulsion.

Suitable second surfactants for use in the solvent-surfactant blends described herein may preferably be degradable and may have a hydrophile-lipophile balance in the range of from a lower limit of about 8, 9, 10, 11, and 12 to an upper limit of about 18, 17, 16, 15, 14, 13, and 12. Suitable surfactants may include, but are not limited to, a polyoxyethylene sorbitan monopalmitate; a polyoxyethylene sorbitan monostearate; a polyoxyethylene sorbitan monooleate; a linear alcohol alkoxylate; an alkyl ether sulfate; a dodecyl benzene sulfonic acid; a sodium dodecyl benzene sulfonate; an alkoxylated nonyl-phenol; an ethoxylated castor oil (e.g., PEG castor oil); dipalmitoylphosphatidylcholine; a sodium 4-(1' heptylnonyl)benzenesulfonate; a polyoxyethylene(8.6) nonyl-phenol ether; a sodium bis-2-ethylhexylsulphosuccinate; a tetraethyleneglycol dodecylether; a sodium octlylbenzenesulfonate; an alkyl propoxy-ethoxysulfate; an alkylarylpropoxy-ethoxysulfate; a highly substituted benzene sulfonate; and any combinations thereof. A highly substituted benzene includes, but is not limited to, substitutions of xylene, toluene, and naphthalene sulfonates.

Suitable solvents for use in the solvent-surfactant blends described herein may include, but are not limited to, a terpene; an alkyl ester; an aryl ester; a short chain alcohol; and any combination thereof. As used herein, the term "short chain alcohol" refers to alcohols having alkyl chains of 1 to 3 carbons. Terpenes are unsaturated aliphatic cyclic hydrocarbons and in the embodiments described herein include monoterpenes and diterpenes. Specific terpenes may include, but are not limited to, d-limonene ($C_{10}H_{16}$). Specific alkyl, cyclic, or aryl esters may include, but are not limited to, ethyl lactate and hexyl ester.

The co-solvents described herein may serve as a coupling agent between the solvent and the surfactant, ensuring flexibility of the interfacial film, thus reducing interfacial tension and aiding the stability of the microemulsion. Suitable co-solvents for use in the solvent-surfactant blends described herein may include, but are not limited to, t-butanol; n-butanol; n-pentanol; n-hexanol; 2-ethyl-hexanol; and any combination thereof. Any midrange primary, secondary and tertiary alcohols with between 1 and 20 carbon atoms may be additionally used as the co-solvent described herein.

One of ordinary skill in the art, with the benefit of this disclosure will recognize the appropriate ratios of water:surfactant, water:solvent, water:co-solvent, surfactant:solvent, surfactant:co-solvent, and co-solvent:solvent in the solvent-surfactant blend to achieve the desired results. In some preferred embodiments, the ratio of the surfactant to solvent in the solvent-surfactant blend may be in the range of from a lower limit of about 2:1, 3:1, 4:1, 5:1, 6:1, 7:1, 8:1, 9:1, and 10:1 to an upper limit of about 20:1, 19:1, 18:1, 17:1, 16:1, 15:1, 14:1, 13:1, 12:1, 11:1, and 10:1. In some preferred embodiments, the ratio of co-solvent to solvent in the solvent-surfactant blend may be in the range of from a lower limit of about 1:3, 1:2.5, 1:2, 1:1.5, and 1:1 to an upper limit of about 3:1, 2.5:1, 2:1, 1.5:1, and 1:1. A suitable commercially available solvent-surfactant blend may include, but is not limited to, GasPerm1000®, available from Halliburton Energy Services, Inc. in Houston, Tex.

In some embodiments, the non-ionic surfactant and/or cationic surfactant and the solvent-surfactant blend are present in the fluid mobility modifier in a ratio in the range of from about 1:5, 1:4, 1:3, 1:2, 1:1, and 2:1 to an upper limit of about 5:1, 4:1, 3:1, and 2:1. The exact ratio of non-ionic surfactant and/or cationic surfactant to solvent-surfactant blend to include in the fluid mobility modifier may depend on a number of factors including, but not limited to, the type of non-ionic surfactant and/or cationic surfactant chosen, the composition of the solvent-surfactant blend, the type of polymeric gelling agent selected, and the like.

The treatment fluids of the present invention may additionally comprise an additive selected from the group consisting of a proppant particulate; a weighting agent; an inert solid; a fluid loss control agent; an emulsifier; a dispersion aid; a corrosion inhibitor; an emulsion thinner; an emulsion thickener; a breaker; a pH control agent; a lost circulation material; a foaming agent; a gas; a biocide; a scale inhibitor; a friction reducer; a clay stabilizing agent; and any combination thereof.

In various embodiments, systems configured for delivering the treatment fluids (i.e., the treatment fluids comprising at least the fluid mobility modifier) described herein to a downhole location are described. In various embodiments, the systems can comprise a pump fluidly coupled to a tubular, the tubular containing the treatment fluids described herein. It will be appreciated that while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a treatment fluid comprising a first aqueous base fluid and a polymeric gelling agent selected from the group consisting of a derivatized guar gum, a cellulose derivative, xanthan, succinoglycan, alginate, chitosan, and any combination thereof, wherein the treatment fluid comprises a first surface tension; introducing a fluid mobility modifier into the treatment fluid, wherein the fluid mobility modifier comprises: a first surfactant selected from the group consisting of a non-ionic surfactant; a cationic surfactant; and any combination thereof, and a solvent-surfactant blend comprising a second aqueous base fluid, a second surfactant, a solvent, and a co-solvent, wherein the solvent-surfactant blend is an oil-in-water microemulsion, wherein the fluid mobility modifier causes the treatment fluid to adopt a second surface tension that is less than the first surface tension; and introducing the treatment fluid into a subterranean formation.

B. A method comprising: providing a treatment fluid comprising a first aqueous base fluid and a polymeric gelling agent selected from the group consisting of a derivatized guar gum, a cellulose derivative, xanthan, succinoglycan, alginate, chitosan, and any combination thereof, wherein the treatment fluid comprises a first surface tension; introducing a fluid mobility modifier into the treatment fluid, wherein the fluid mobility modifier comprises: a first surfactant selected from the group consisting of a non-ionic surfactant; a cationic surfactant; and any combination thereof, and a solvent-surfactant blend comprising a second aqueous base fluid, a second surfactant, a solvent, and a co-solvent, wherein the solvent-surfactant blend is an oil-in-water microemulsion, wherein the ratio of the first surfactant to the solvent-surfactant blend is in the range of between about 1:5 to about 5:1, wherein the fluid mobility modifier causes the treatment fluid to adopt a second surface tension that is less than the first surface tension; and introducing the treatment fluid into a subterranean formation.

C. A system comprising: a wellhead with a tubular extending therefrom and into a wellbore in a subterranean formation; and a pump fluidly coupled to the tubular, the tubular containing a treatment fluid comprising a first aqueous base fluid, a polymeric gelling agent selected from the group consisting of a derivatized guar gum, a cellulose derivative, xanthan, succinoglycan, alginate, chitosan, and any combination thereof, and a fluid mobility modifier, the fluid mobility modifier comprising a first surfactant selected from the group consisting of a non-ionic surfactant; a cationic surfactant; and any combination thereof and a solvent-surfactant blend comprising a second aqueous base fluid, a second surfactant, a solvent and a co-solvent.

Each of embodiments A, B, and C may have one or more of the following additional elements in any combination:

Element 1: Wherein the ratio of the first surfactant to the solvent-surfactant blend is in the range of between about 1:5 to about 5:1.

Element 2: Wherein the first surfactant is selected from the group consisting of an alkyoxylate; an alkylphenol; an ethoxylated alkyl amine; an ethoxylated oleate; a tall oil; an ethoxylated fatty acid; a trimethylcocoammonium chloride; a trimethyltallowammonium chloride; a dimethyldicocoammonium chloride; a bis(2-hydroxyethyl)tallow amine; a bis (2-hydroxyethyl)erucylamine; a bis(2-hydroxyethyl)cocoamine; a cetylpyridinium chloride; and any combination thereof.

Element 3: Wherein the second surfactant has a hydrophile-lipophile balance in the range of between about 8 and about 18.

Element 4: Wherein the second surfactant is selected from the group consisting of a polyoxyethylene sorbitan monopalmitate; a polyoxyethylene sorbitan monostearate; a polyoxyethylene sorbitan monooleate; a linear alcohol alkoxylate; an alkyl ether sulfate; a dodecyl benzene sulfonic acid; a sodium dodecyl benzene sulfonate; an alkoxylated nonylphenol; an ethoxylated castor oil; dipalmitoylphosphatidylcholine; a sodium 4-(1' heptylnonyl)benzenesulfonate; a polyoxyethylene(8.6) nonyl-phenol ether; a sodium bis-2-ethylhexylsulphosuccinate; a tetraethyleneglycol dodecylether; a sodium octylbenzenesulfonate; an alkyl propoxyethoxysulfate; an alkylarylpropoxy-ethoxysulfate; a highly substituted benzene sulfonate; and any combinations thereof.

Element 5: Wherein the solvent in the solvent is selected from the group consisting of a terpene; an alkyl ester; an aryl ester; a short chain alcohol; and any combination thereof.

Element 6: Wherein the co-solvent is selected from the group consisting of t-butanol; n-butanol; n-pentanol; n-hexanol; 2-ethyl-hexanol; and any combination thereof.

Element 7: Wherein the co-solvent is at least one of a primary alcohol, a secondary alcohol, and a tertiary alcohol having between 1 and 20 carbon atoms.

Element 8: Wherein the second surfactant and solvent in the surfactant-solvent blend are present in a second surfactant:solvent ratio in the range of between about 2:1 to about 20:1.

Element 9: Wherein the co-solvent and solvent in the surfactant-solvent blend are present in a co-solvent:solvent ratio in the range of between about 1:3 to about 3:1.

Element 10: Wherein the treatment fluid further comprises an additive selected from the group consisting of a proppant particulate; a weighting agent; an inert solid; a fluid loss control agent; an emulsifier; a dispersion aid; a corrosion inhibitor; an emulsion thinner; an emulsion thickener; a breaker; a pH control agent; a lost circulation material; a foaming agent; a gas; a biocide; a scale inhibitor; a friction reducer; a clay stabilizing agent; and any combination thereof.

By way of non-limiting example, exemplary combinations applicable to A, B, C include: A with 2, 4, and 10; A with 5 and 7; A with 3, 8, and 9; A with 1 and 4; B with 5, 6, and 10; B with 3 and 8; B with 4 and 7; B with 10; C with 1 and 10; C with 2, 3, 4, and 7; C with 8 and 9.

To facilitate a better understanding of the embodiments of the present invention, the following examples of preferred or representative embodiments are given. In no way should the following examples be read to limit, or to define, the scope of the invention.

EXAMPLE 1

In this example, the emulsion tendency reduction of a treatment fluid comprising a fluid mobility modifier was evaluated. A demulsification test was performed using a $CO_2$ seltzer device. An example of a suitable $CO_2$ seltzer device is an ISI Twist'n Sparkle beverage carbonation system. The device comprises a quart stainless steel vessel equipped with a hand operated valve and spout to foam the contents of the vessel using a pre-pressurized $CO_2$ cartridge. Two treatment fluids were evaluated using the demulsification test.

A first mixture (M1) served as a control fluid. M1 was prepared using 50 mL of crude oil (simulating the oil that may be located within a subterranean formation) and 50 mL of a broken treatment fluid (TF1) comprising 40 ppt WG-39™ polymeric gelling agent in fresh water. TF1 did not comprise the fluid mobility modifiers described herein. M1 was added to a blender jar and blended at 12,000 rpm for 30 seconds. Thereafter, M1 was removed from the blender jar and placed into the vessel of the $CO_2$ seltzer device. The pressurized $CO_2$ cartridge was released into the vessel and the $CO_2$ seltzer device inverted and vigorously shaken 5 times. Thereafter, M1 was removed from the vessel of the $CO_2$ seltzer device and into a 500 mL graduated cylinder. M1 was observed in the graduated cylinder at time 0, 1 minute, and 10 minutes. At time 0, M1 was observed as a highly emulsified fluid, showing a volume of 200 mL, despite an initial input of only 100 mL. Clear bubble formation was evident on the surface of M1 and distributed throughout. After 1 minute, the fluid decreased to 100 mL, but remained observably emulsified, with apparent foaming on the surface and bubble formation throughout, and visibly appeared the same after the elapse of 10 minutes.

The mixture (M2) was prepared using 50 mL of crude oil and 50 mL of a broken treatment fluid (TF2) comprising 40 ppt WG-39™ polymeric gelling agent in fresh water and 1 gallons per thousand gallons ("gpt") fluid mobility modifier comprising 1:1 LoSurf-300D™ non-ionic surfactant to GasPerm1000® solvent-surfactant blend. The demulsification test was performed on M2 as described above. At time 0, only minimal signs of emulsification were observed and solely on the surface of the fluid. No apparent bubble formation was observed throughout the fluid. After 1 minute, no emulsification was apparent and no changes were observed after 10 minutes, demonstrating that the fluid mobility modifier present in TF2 (and M2) was capable of reducing emulsion tendency.

EXAMPLE 2

In this example, the emulsion tendency reduction of a treatment fluid comprising a fluid mobility modifier according to some embodiments described herein was evaluated. Two test treatment fluids were prepared and their emulsion tendency tested using surface tension measurements upon exposure to a sand pack. Two sand packs were prepared (SP1 and SP2) using washed and dried 70-140 Oklahoma sand. The Oklahoma sand was packed into a 2.54 cm (1 in)×25.4 cm (10 in) glass chromatography column until the sand filled 10.16 cm (4 in) of the column. The pore volume of the sand pack was determined by measuring the volume of water required to fill packed column.

The first treatment fluid (TF3) served as a control fluid comprising only a portion of the fluid mobility modifier. TF3 comprised a broken treatment fluid comprising 60 ppt WG-39™ polymeric gelling agent in fresh water and 1 gpt LoSurf-300D™ non-ionic surfactant. TF3 did not comprise a solvent-surfactant blend and, thus, did not comprise the fluid mobility modifier blends described herein. The surface tension of TF3 was measured before exposure to the sand pack, SP1. Thereafter, three pore volumes of TF3 were run through SP1 and the surface tension of each effluent was measured.

The second treatment fluid (TF4) comprised a complete fluid mobility modifier. TF4 comprised a broken treatment fluid comprising 60 ppt WG-39™ polymeric gelling agent in fresh water and 1 gpt fluid mobility modifier comprising 1:1 LoSurf-300D™ non-ionic surfactant to GasPerm1000® solvent-surfactant blend. The surface tension of TF4 was measured before exposure to the sand pack, SP2. Thereafter, three pore volumes of TF4 were run through SP2 and the surface tension of each effluent was measured.

The surface tension measurement results are shown in Table 1. The surface tension of TF4 comprising the fluid mobility modifier in the treatment fluid, as described in embodiments herein, maintained a much reduced surface tension, indicating its ability to reduce the emulsion tendency of a treatment fluid, as compared to TF3 comprising solely the non-ionic surfactant. The reduced emulsion tendency was observed even after multiple exposures to the surface area of the sand pack. Thus, the fluid mobility modifiers comprising the non-ionic surfactant or cationic surfactant and the solvent-surfactant blend described herein operated synergistically to reduce the emulsion tendency of the treatment fluid.

TABLE 1

| Fraction | Surface Tension (mN/m) | |
|---|---|---|
| | TF3 | TF4 |
| Treatment Fluid before Exposure to Sand Pack | 31.100 | 30.030 |
| Pore Volume #1 | 46.370 | 31.300 |
| Pore Volume #2 | 47.530 | 30.250 |
| Pore Volume #3 | 50.010 | 30.130 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising a first aqueous base fluid and a polymeric gelling agent selected from the group consisting of a derivatized guar gum, a cellulose derivative, xanthan, succinoglycan, alginate, chitosan, and any combination thereof,
wherein the treatment fluid comprises a first surface tension;
introducing a fluid mobility modifier into the treatment fluid,
wherein the fluid mobility modifier comprises:
a first surfactant selected from the group consisting of an ethoxylated oleate; a tall oil; a trimethylcocoammonium chloride; a trimethyltallowammonium chloride; a dimethyldicocoammonium chloride; a bis(2-hydroxyethyl)tallow amine; a bis(2-hydroxyethyl)erucylamine; a bis(2-hydroxyethyl)coco-amine; a cetylpyridinium chloride; and any combination thereof, and
a solvent-surfactant blend comprising a second aqueous base fluid, a second surfactant, a solvent, and a co-solvent,
wherein the second surfactant is selected from the group consisting of a polyoxyethylene sorbitan monopalmitate; a polyoxyethylene sorbitan monostearate; a polyoxyethylene sorbitan monooleate; a linear alcohol alkoxylate; a dodecyl benzene sulfonic acid; a sodium dodecyl benzene sulfonate; an alkoxylated nonyl-phenol; an ethoxylated castor oil; dipalmitoylphosphatidylcholine; a sodium 4-(1' heptylnonyl)benzenesulfonate; a polyoxyethylene(8.6) nonyl-phenol ether; a sodium bis-2-ethylhexylsulphosuccinate; a tetraethyleneglycol dodecylether; a sodium octlylbenzenesulfonate; an alkyl propoxy-ethoxysulfate; an alkylarylpropoxy-ethoxysulfate; a highly substituted benzene sulfonate; and any combinations thereof,
wherein the solvent-surfactant blend is an oil-in-water emulsion,
wherein the ratio of the first surfactant to the solvent-surfactant blend is in the range of between about 1:5 to about 5:1,
wherein the fluid mobility modifier causes the treatment fluid to adopt a second surface tension that is less than the first surface tension, and wherein a combination of the fluid mobility modifier and the solvent-surfactant blend operate to reduce the emulsion tendency of the treatment fluid; and
introducing the treatment fluid into a subterranean formation.

2. The method of claim 1, wherein the second surfactant has a hydrophile-lipophile balance in the range of between about 8 and about 18.

3. The method of claim 1, wherein the solvent in the solvent is selected from the group consisting of a terpene; an alkyl ester; an aryl ester; a short chain alcohol; and any combination thereof.

4. The method of claim 1, wherein the co-solvent is selected from the group consisting of t-butanol; n-butanol; n-pentanol; n-hexanol; 2-ethyl-hexanol; and any combination thereof.

5. The method of claim 1, wherein the co-solvent is at least one of a primary alcohol, a secondary alcohol, and a tertiary alcohol having between 1 and 20 carbon atoms.

6. The method of claim 1, wherein the second surfactant and solvent in the surfactant-solvent blend are present in a second surfactant:solvent ratio in the range of between about 2:1 to about 20:1.

7. The method of claim 1, wherein the co-solvent and solvent in the surfactant-solvent blend are present in a co-solvent:solvent ratio in the range of between about 1:3 to about 3:1.

8. The method of claim 1, wherein the treatment fluid further comprises an additive selected from the group consisting of a proppant particulate; a weighting agent; an inert solid; a fluid loss control agent; an emulsifier; a dispersion aid; a corrosion inhibitor; an emulsion thinner; an emulsion thickener; a breaker; a pH control agent; a lost circulation material; a foaming agent; a gas; a biocide; a scale inhibitor; a friction reducer; a clay stabilizing agent; and any combination thereof.

9. A method comprising:
providing a treatment fluid comprising a first aqueous base fluid and a polymeric gelling agent selected from the group consisting of a derivatized guar gum, a cellulose derivative, xanthan, succinoglycan, alginate, chitosan, and any combination thereof,
wherein the treatment fluid comprises a first surface tension;
introducing a fluid mobility modifier into the treatment fluid,
wherein the fluid mobility modifier comprises:
a first surfactant selected from the group consisting of an ethoxylated oleate; a tall oil; a trimethylcocoammonium chloride; a trimethyltallowammonium chloride; a dimethyldicocoammonium chloride; a bis(2-hydroxyethyl)tallow amine; a bis(2-hydroxyethyl)erucylamine; a bis(2-hydroxyethyl)coco-amine; a cetylpyridinium chloride; and any combination thereof, and
a solvent-surfactant blend comprising a second aqueous base fluid, a second surfactant, a solvent, and a co-solvent,
wherein the second surfactant is selected from the group consisting of a polyoxyethylene sorbitan monopalmitate; a polyoxyethylene sorbitan monostearate; a polyoxyethylene sorbitan monooleate; a linear alcohol alkoxylate; a dodecyl benzene sulfonic acid; a sodium dodecyl benzene sulfonate; an alkoxylated nonyl-phenol; an ethoxylated castor oil; dipalmitoylphosphatidylcholine; a sodium 4-(1' heptylnonyl)benzenesulfonate; a polyoxyethylene(8.6) nonyl-phenol ether; a sodium bis-2-ethylhexylsulphosuccinate; a tetraethyleneglycol dodecylether; a sodium octlylbenzenesulfonate; an alkyl propoxy-ethoxysulfate; an alkylarylpropoxy-ethoxysulfate; a highly substituted benzene sulfonate; and any combinations thereof,
wherein the solvent-surfactant blend is an oil-in-water emulsion,
wherein the ratio of the first surfactant to the solvent-surfactant blend is in the range of between about 1:5 to about 5:1,
wherein the ratio of the second surfactant to the solvent in the solvent-surfactant blend is in the range of about 2:1 to about 20:1,
wherein the fluid mobility modifier causes the treatment fluid to adopt a second surface tension that is less than the first surface tension, and, and wherein a combination of the fluid mobility modifier and the solvent-surfactant blend operate to reduce the emulsion tendency of the treatment fluid; and
introducing the treatment fluid into a subterranean formation.

10. The method of claim 9, wherein the second surfactant has a hydrophile-lipophile balance in the range of between about 8 and about 18.

11. The method of claim 9, wherein the solvent in the solvent is selected from the group consisting of a terpene; an alkyl ester; an aryl ester; a short chain alcohol; and any combination thereof.

12. The method of claim 9, wherein the co-solvent is selected from the group consisting of t-butanol; n-butanol; n-pentanol; n-hexanol; 2-ethyl-hexanol; and any combination thereof.

13. The method of claim 9, wherein the co-solvent is at least one of a primary alcohol, a secondary alcohol, and a tertiary alcohol having between 1 and 20 carbon atoms.

14. The method of claim 9, wherein the co-solvent and solvent in the surfactant-solvent blend are present in a co-solvent:solvent ratio in the range of between about 1:3 to about 3:1.

15. A system comprising:
a wellhead with a tubular extending therefrom and into a wellbore in a subterranean formation; and
a pump fluidly coupled to the tubular, the tubular containing a treatment fluid comprising a first aqueous base fluid, a polymeric gelling agent selected from the group consisting of a derivatized guar gum, a cellulose derivative, xanthan, succinoglycan, alginate, chitosan, and any combination thereof, and a fluid mobility modifier,
the fluid mobility modifier comprising:
a first surfactant selected from the group consisting of an ethoxylated oleate; a tall oil; a trimethylcocoammonium chloride; a trimethyltallowammonium chloride; a dimethyldicocoammonium chloride; a bis(2-hydroxyethyl)tallow amine; a bis(2-hydroxyethyl)erucylamine; a bis(2-hydroxyethyl)coco-amine; a cetylpyridinium chloride; and any combination thereof, and
a solvent-surfactant blend comprising a second aqueous base fluid, a second surfactant, a solvent and a co-solvent, wherein the ratio of the first surfactant to the solvent-surfactant blend is in the range of between about 1:5 to about 5:1; and
wherein the second surfactant is selected from the group consisting of a polyoxyethylene sorbitan monopalmitate; a polyoxyethylene sorbitan monostearate; a polyoxyethylene sorbitan monooleate; a linear alcohol alkoxylate; a dodecyl benzene sulfonic acid; a sodium dodecyl benzene sulfonate; an alkoxylated nonyl-phenol; an ethoxylated castor oil; dipalmitoylphosphatidylcholine; a sodium 4-(1' heptylnonyl)benzenesulfonate; a polyoxyethylene(8.6) nonyl-phenol ether; a sodium bis-2-ethylhexylsulphosuccinate; a tetraethyleneglycol dodecylether; a sodium octlylbenzenesulfonate; an alkyl propoxy-ethoxysulfate; an alkylarylpropoxy-ethoxysulfate; a highly substituted benzene sulfonate; and any combinations thereof;
wherein a combination of the fluid mobility modifier and the solvent-surfactant blend operate to reduce the emulsion tendency of the treatment fluid.

* * * * *